US009286627B1

(12) United States Patent
Siegel et al.

(10) Patent No.: US 9,286,627 B1
(45) Date of Patent: Mar. 15, 2016

(54) PERSONAL WEBSERVICE FOR ITEM ACQUISITIONS

(75) Inventors: Hilliard B. Siegel, Seattle, WA (US); Ryan J. Snodgrass, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 253 days.

(21) Appl. No.: 13/101,065

(22) Filed: May 4, 2011

(51) Int. Cl.
G06Q 30/00 (2012.01)
G06Q 30/02 (2012.01)
G06Q 30/06 (2012.01)

(52) U.S. Cl.
CPC ........ G06Q 30/0281 (2013.01); G06Q 30/0601 (2013.01); G06Q 30/0633 (2013.01)

(58) Field of Classification Search
CPC .............. G06Q 30/06; G06Q 30/0633; G06Q 30/0281; G06Q 30/0601
USPC .......... 705/26.8, 26.1, 27.1, 22, 14.25, 14.27, 705/14.36, 347, 26.7
See application file for complete search history.

(56) References Cited

U.S. PATENT DOCUMENTS

| | | | | |
|---|---|---|---|---|
| 4,274,567 | A * | 6/1981 | Sawyer | 224/411 |
| 6,473,738 | B1 * | 10/2002 | Garrett | 705/26.8 |
| 7,467,401 | B2 * | 12/2008 | Cicchitto | 726/4 |
| 7,668,821 | B1 * | 2/2010 | Donsbach et al. | 707/765 |
| 8,447,829 | B1 * | 5/2013 | Geller et al. | 709/217 |
| 2002/0143659 | A1 * | 10/2002 | Keezer et al. | 705/27 |
| 2006/0064734 | A1 * | 3/2006 | Ma | 725/136 |
| 2006/0244839 | A1 * | 11/2006 | Glatron et al. | 348/211.11 |
| 2008/0109232 | A1 * | 5/2008 | Musgrove et al. | 705/1 |
| 2008/0204243 | A1 * | 8/2008 | Backes et al. | 340/572.1 |
| 2009/0182644 | A1 * | 7/2009 | Panagopulos | G06Q 30/0601 705/26.1 |
| 2009/0222333 | A1 * | 9/2009 | Rivas | 705/14 |
| 2010/0145730 | A1 * | 6/2010 | Abreu | G06K 7/10861 705/3 |
| 2011/0258065 | A1 * | 10/2011 | Fordyce, III | G06Q 10/10 705/26.1 |
| 2012/0123910 | A1 * | 5/2012 | George | 705/27.1 |
| 2012/0225721 | A1 * | 9/2012 | Holder et al. | 463/42 |
| 2012/0239513 | A1 * | 9/2012 | Oliver et al. | 705/14.73 |
| 2012/0278177 | A1 * | 11/2012 | Bender et al. | 705/14.66 |
| 2013/0091030 | A1 * | 4/2013 | Lewis et al. | 705/26.1 |

\* cited by examiner

Primary Examiner — Yogesh C Garg
(74) Attorney, Agent, or Firm — Lee & Hayes, PLLC

(57) ABSTRACT

Architectures and techniques are described to provide a personal webservice for item acquisitions. In particular implementations, the personal webservice of the individual indicates items that have been acquired by the individual and/or items that the individual has indicated an interest in acquiring. Information specifying items acquired by the individual may be obtained from computing devices of the individual, third-party data sources (e.g. financial entities, socials networking sites), or both. Additionally, a number of webservice applications and/or webservice agents may provide supplemental information about items included in the personal webservice of the individual, provide notifications derived from the supplemental information about the items, or both. The supplemental information may be obtained from manufacturers of the items, online content related to the items (e.g. news articles, blog posts, reviews), information from merchants offering the items for acquisition, and the like.

26 Claims, 8 Drawing Sheets

PERSONAL WEBSERVICE FOR ITEM ACQUISITIONS

BACKGROUND

Over the lifetime of an individual, the individual may acquire a number of items. In some cases, the individual may possess the items for a short duration, while in other cases the individual may possess the items for a longer period of time. In any case, information about the items acquired by individuals may be produced by a variety of sources during the period of time that the individual possesses the items.

In a particular example, reviews or articles may be published about items acquired by an individual and/or posts on discussion boards or blogs may be produced about items acquired by the individual. In another example, manufacturers of items may release information about recalls or safety issues of items produced by the manufacturers and/or updates to manuals provided with certain items. In an additional example, software updates may be provided by manufacturers of electronic devices, distributors of software applications, and the like. Often individuals may be unaware that supplemental information about items they have acquired is available. Additionally, information about items that individuals have acquired may be stored by the individual in a paper file system that is inconvenient to maintain and does not facilitate efficient access to the information. In some cases, financial services software may store some information about items acquired by the individual, but this information is often limited in scope and application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
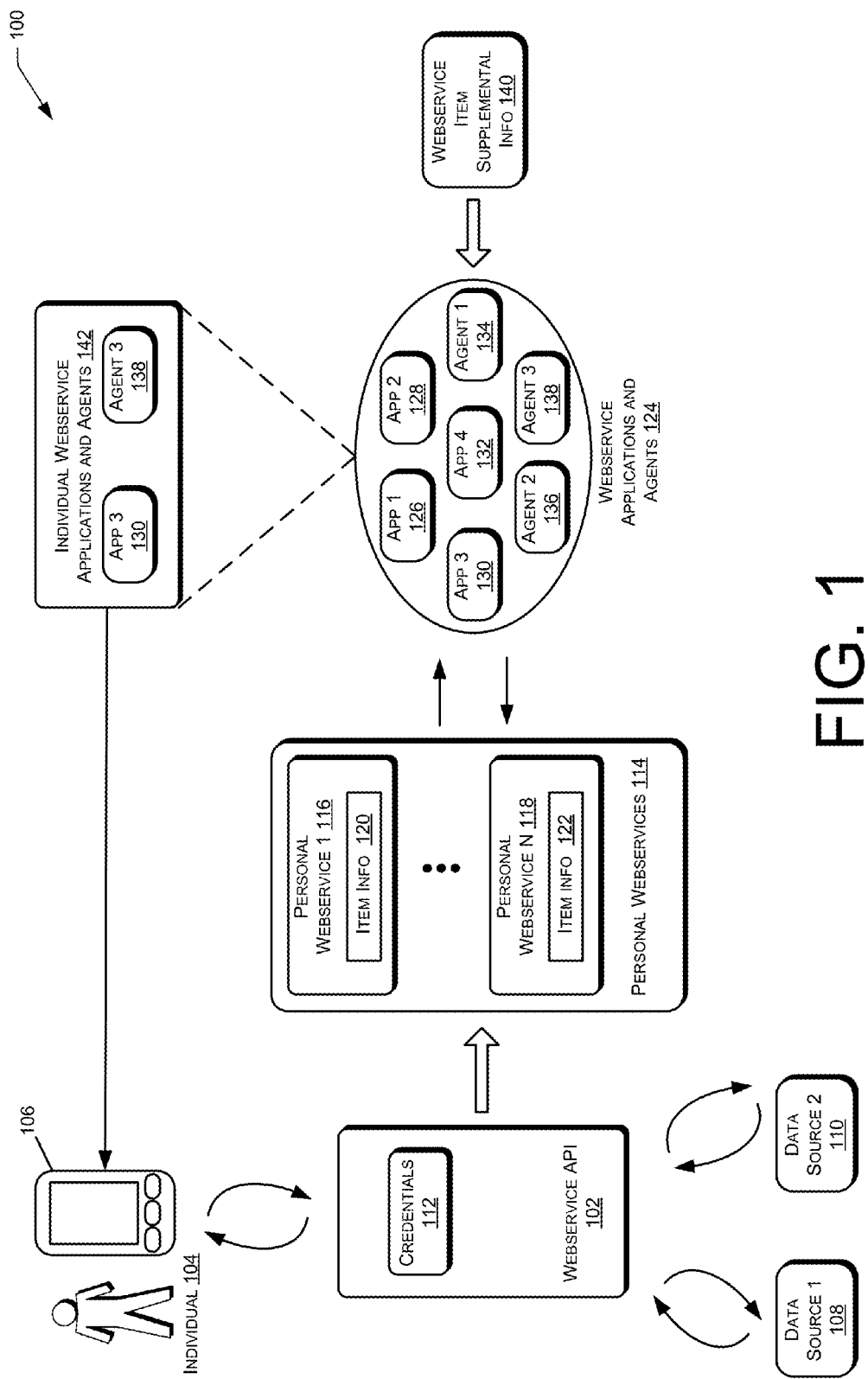
FIG. 1 illustrates an architecture to provide a personal webservice for items acquired by an individual.

This disclosure describes architectures and techniques to provide a personal webservice for items acquired by an individual. In particular implementations, an individual may acquire an item from a merchant. The item may be added to a personal webservice of the individual. The personal webservice of the individual may indicate items that have been acquired by the individual. The personal webservice may also include information about the items, such as respective prices of the items, respective merchants that the individual acquired the items from, respective dates of acquisition of the items, and so on.

In order to identify items acquired by the individual, a service provider offering the personal webservice may obtain information about items acquired by the individual from a number of sources. In some cases, the individual may provide the information to the service provider. For example, the individual may forward an email indicating acquisition of an item to the service provider. Additionally, the individual may capture an image of at least a portion of the item and send the image to the service provider with a message indicating that the individual has acquired the item. In some instances, the image may include an identifier of the item, such as a Universal Product Code (UPC).

The service provider may also obtain information about the acquisition of items by the individual from computing devices of the individual. In a particular implementation, the service provider may send a request to an application residing on a computing device of the individual to obtain information related to the acquisition of items by the individual. In certain situations, the request may be directed to an email application to obtain emails associated with the acquisition of items. In other situations, the request may be directed to a spreadsheet application or a financial services application to obtain information about item acquisitions by the individual.

The service provider may also obtain information about items acquired by the individual from third-party data sources. In one example, the service provider may obtain information from financial institutions, such as banks, credit card companies, credit unions, and the like, to identify information about item acquisitions by the individual. The service provider may also obtain information about item acquisitions by the individual from social networking services (e.g. social networking sites, social networking mobile applications, etc.) and/or merchants that provided the items to the individual. The service provider may need to provide a proper credential to respective third-party data sources in order to obtain information related to item acquisitions by the individual.

In some scenarios, the service provider may obtain information about items that the individual has indicated a desire to acquire, but has not yet acquired. To illustrate, the service provider may obtain information about items included in a media rental queue of the individual. In another illustration, the service provider may obtain information about wish lists or registries of the individual with one or more merchants.

The service provider may also obtain supplemental information about items acquired by the individual and/or items to be acquired by the individual that are included in the personal webservice of the individual. In some cases, the supplemental information may include at least portions of articles relating to items of the personal webservice, blog posts relating to items of the personal webservice, reviews relating to items of the personal webservice, warranty information relating to items of the personal webservice, recall information relating to items of the personal webservice, software updates relating to items of the personal webservice, online discussions relating to items of the personal webservice, manuals relating to items of the personal webservice, or combinations thereof. The service provider may obtain the supplemental information relating to items of the personal webservice by monitoring one or more sites for information about the personal webservice items. Additionally, the service provider may invoke a webcrawler to identify information about the personal webservice items. In other situations, the service provider may have arrangements with certain sites or entities (e.g. item manufacturers, merchants, etc.) to provide information to the service provider that is related to items included in personal webservices maintained by the service provider.

The service provider may also provide a number of webservice applications and/or webservice agents to individuals. The webservice applications or agents may provide certain supplemental information about items included in the personal webservices of individuals. In a particular situation, the service provider may provide a warranty and recalls webservice application or agent that obtains supplemental information about warranties and recalls associated with items included in personal webservices of individuals. The warranty and recalls webservice application/agent may provide notifications indicating when warranties are set to expire on items acquired by individuals. Additionally, the warranties and recalls webservice application/agent may also provide news articles and/or notices from manufacturers indicating that a particular item or a portion of the particular item is the subject of a recall.

By providing personal webservices for individuals, a service provider can provide opportunities for individuals to aggregate information about items they have acquired. Thus, individuals may conveniently store and access information about the items that have been acquired. Additionally, the service provider may offer webservice applications and agents that provide supplemental information to individuals about the items they have acquired. Thus, individuals may be able to conveniently keep up with information that is produced about items that they have acquired without having to spend large amounts of time tracking down the information or without relying on chance that they will find out about important notices or information concerning items they have acquired.

Example Architecture

FIG. 1 illustrates an architecture 100 to provide a personal webservice for items acquired by an individual. The architecture 100 includes a webservice application programming interface (API) 102. The webservice API 102 obtains information about items acquired by individuals, such as individual 104, and/or items that individuals have indicated an interest in acquiring.

The items acquired by the individual 104 may include tangible items, intangible items, products, goods, services, a bundle of items, digital goods, digital services, coupons/deals, and the like. In addition, the acquisition of items by the individual 104 may be achieved through purchasing items, renting items, borrowing items, trading items, bartering items, etc. Further, the individual 104 may operate a computing device 106. The computing device 106 may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like.

In some cases, the webservice API 102 may obtain information about items acquired by the individual 104 from the computing device 106. For example, the individual 104 may operate one or more input devices of the computing device 106 to provide information to the webservice API 102 about items acquired by the individual 104. To illustrate, the individual 104 may operate a camera of the computing device 106 to capture an image of at least a portion of an item acquired by the individual 104 and send the image to the webservice API 102. In some cases, the image may include an identifier of the item, such as text indicating a name and model number of the item or a UPC of the item. In other cases, the individual 104 may enter text into an application or page provided by the webservice API 102 that captures information about item acquisitions, such as price of an item, date of purchase of the item, manufacturer of the item, model of the item, merchant offering the item, warranty information related to the item, and so forth. Further, the individual 104 may forward emails indicating acquisition of items to the webservice API 102. In certain scenarios, the emails may have been provided to the computing device 106 upon acquisition of an item online from a merchant.

The webservice API 102 may also extract information about item acquisitions from the computing device 106. In particular implementations, the webservice API 102 may obtain emails from an email application residing on the computing device 106 that are related to the acquisition of items. In an illustrative example, the webservice API 102 may send a request to an email application of the computing device 106 for emails including content related to the acquisition of one or more items. Additionally, the webservice API 102 may obtain item acquisition information from other applications residing on the computing device 106, such as a personal finance application, a business finance application, an accounting application, a spreadsheet application, a word processing application, a database application, an operating system, a data retrieval application, combinations thereof, and so forth. In some cases, the webservice API 102 may utilize one or more credentials 112 to obtain item acquisition data from applications of the computing device 106. The credentials 112 may include user names, passwords, tokens, security keys, etc.

The webservice API 102 may also obtain information about items acquired by the individual 104 from one or more third-party data sources, such as data sources 108, 110. The third-party data sources 108, 110 may include financial institutions (e.g. banks, credit unions, etc.), credit card companies, financial services companies, merchants, and the like. For example, the webservice API 102 may obtain records of transactions conducted by the individual 104 to acquire items. The webservice API 102 may also utilize the credentials 112 to obtain item acquisition data from the data sources 108, 110.

When the webservice API 102 receives item acquisition data from the computing device 106 and/or the third-party data sources 108, 110, the webservice API 102, or another component of a service provider, may extract information related to the acquisition of items from the item acquisition data. In some implementations, the webservice API 102 may utilize image recognition techniques to identify an item acquired by the individual 104 from an image of the item. The webservice API 102 may also extract information about items acquired by the individual 104 from emails, reports, documents, spreadsheets, extensible markup language (XML) files, and so on, obtained from the computing device 106 and/or the third-party data sources 108, 110.

After identifying information related to the acquisition of items by individuals, the webservice API 102, or another component of a service provider, may store the information in one or more personal webservices 114. In the illustrative example shown in FIG. 1, the personal webservices 114 includes a first personal webservice 116 that corresponds to the individual 104 and a number of other personal webservices up to personal webservice N 118. Each respective personal webservice 116, 118 includes item information 120, 122. The item information 120, 122 may include information about items acquired by the individuals associated with the respective personal webservices 116, 118. For example, the item information 120 may include information related to items acquired by the individual 104 that was obtained via the webservice API 102. To illustrate, the item information 120 may include prices of items, dates of acquisition of items, merchants that provided the items to individuals, manufacturers of the items, etc.

In some situations, the webservice API 102 may store information about a portion of the items acquired by individuals in the personal webservices 114. In one example, the webservice API 102 may refrain from storing information about items that individuals may possess for a short period of time, such as some food items. In another example, the individuals associated with the personal webservices 114 may specify preferences for storing only certain items that have been acquired. In particular instances, the information about some items may be stored in the personal webservices 114 temporarily. To illustrate, information about particular food items may be stored in the personal webservices 114 until the items are consumed, until an expiration date lapses, and/or until another specified period of time expires.

The architecture 100 also includes a number of webservice applications and agents 124. In the illustrative implementation shown in FIG. 1, the webservice applications and agents 124 include particular webservice applications 126-132 and particular webservice agents 134-138. Each of the webservice applications 126-132 and the webservice agents 134-138 may be executable to perform respective operations with respect to information associated with items stored in the personal webservices 114. That is, each of the webservice applications and agents 126-138 may perform different operations with respect to items stored in the personal webservices 114. In some situations, at least some of the webservice applications and agents 126-138 may perform their respective operations with respect to different items of the personal webservices 114.

Additionally, in certain scenarios, the webservice applications 126-132 may operate when invoked by a user of a respective webservice application 126-132, such as the individual 104. In other instances, the webservice applications 126-132 may operate when invoked by another webservice application, a webservice agent 134-138, and/or another application, program, or module, such a module residing on a service provider server or an application residing on the computing device 106. Further, the webservice agents 134-138 may operate in the background periodically or continuously without being expressly invoked by a user associated with the respective webservice agents 134-138.

In some cases, the webservice applications and agents 126-138 may parse webservice item supplemental information 140 to provide a portion of the webservice item supplemental information 140 related to items acquired by a particular individual to a computing device of the particular individual. The webservice applications and agents 126-138 may also utilize the webservice item supplemental information 140 to derive notifications relating to items acquired by an individual and stored in a respective personal webservice 114. The webservice item supplemental information 140 may include information obtained from manufacturers of items, merchants offering items for acquisition, items acquired by individuals (e.g. vehicles, appliances, electronic devices, etc.). The webservice item supplemental information 140 may also include information obtained from a number of sites, such as news articles, reviews, discussion board posts, blog posts, micro-blogging posts, and the like.

In the particular implementation shown in FIG. 1, the individual 104 is associated with individual webservice applications and agents 142. The individual webservice applications 142 may include the particular webservice application 130 and the particular webservice agent 138. In some cases, the webservice application 130 and/or the webservice agent 138 may reside on the computing device 106, while in other cases, the webservice application 130 and/or the webservice agent 138 may reside remotely, such as on a server of a service provider that provides the webservice applications and agents 124.

In an illustrative implementation, the third webservice agent 138 may be a warranty and recalls webservice application. Accordingly, the third webservice agent 138 may track the expiration of warranties of certain items of the personal webservice 116. When the warranty associated with an item of the personal webservice 116 is set to expire within a specified period of time, the third webservice agent 138 may generate a notification for the individual 104 that indicates when the warranty will expire. The notification may also include options related to the expiration of the warranty, such as an option to extend the warranty, an option to purchase replacement parts for the item, an option to view an owner's manual related to the item, recommendations to acquire one or more additional items to replace the item, and so forth. The third webservice agent 138 may also obtain webservice item supplemental information 140 that is directed to recalls of items of the personal webservice 116. In particular, the third webservice agent 138 may obtain portions of the webservice item information 140, such as news articles, manufacturers' notices, etc., that indicate a recall of an item of the personal webservice 116. In these situations, the third webservice agent 138 may forward any articles indicating recalls of an item of the personal webservice 116 to the computing device 106 or generate a notification for the individual 104 that indicates recall of an item of the personal webservice 116.

Accordingly, by utilizing the architectures and techniques described herein, an individual can conveniently obtain pertinent information about items they have acquired. In particular, an individual does not need to spend time looking online for information about items that have been acquired or obtaining information from media distribution services related to items that have been acquired. Rather, information that the individual considers important may be provided to them via a computing device through one or more specific webservice applications or agents. Additionally, individuals can access information about items stored in their personal webservice and eliminate paper file systems that can be time consuming and inconvenient to maintain, that occupy large amounts of space, and that do not provide convenient access to information.

Example Framework

Figure 2:
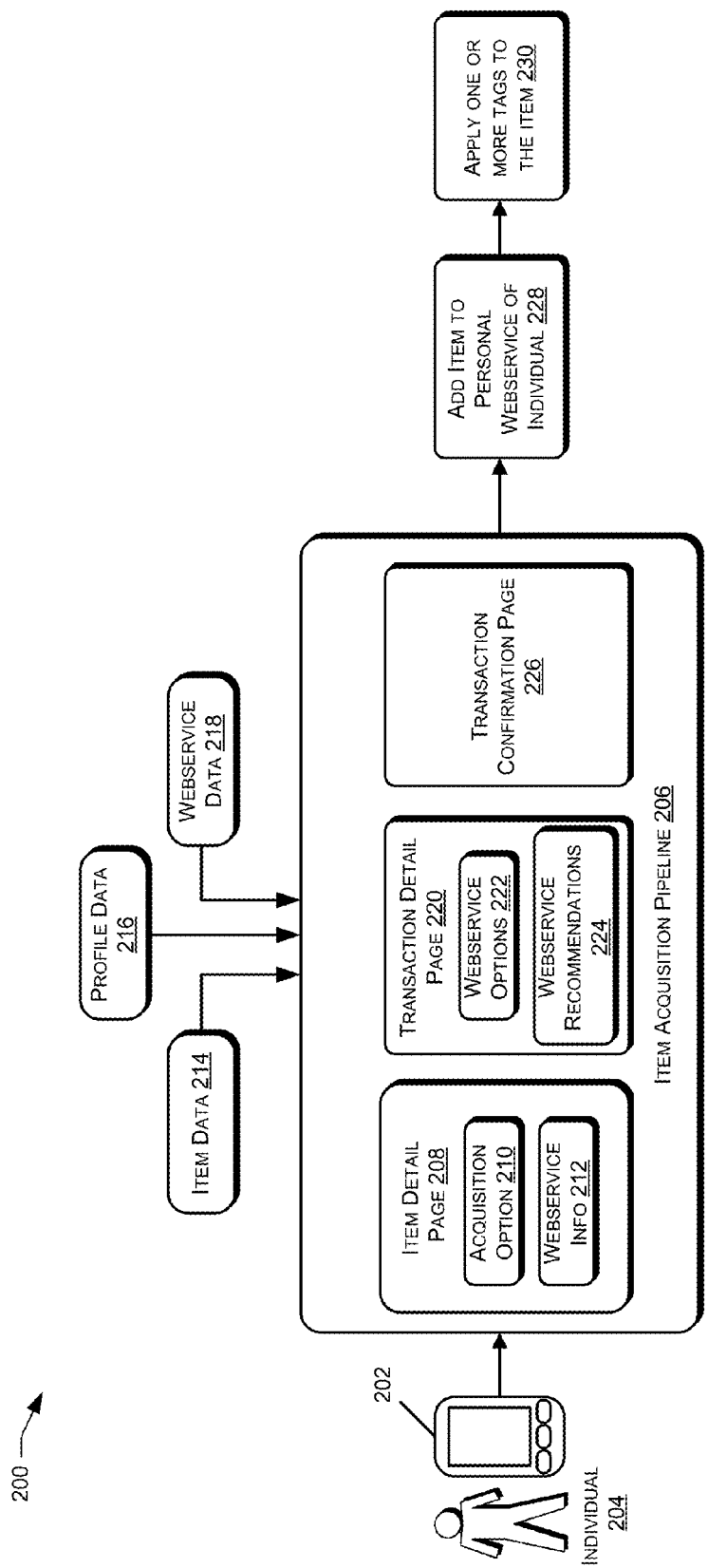
FIG. 2 illustrates a framework to provide item acquisition user interfaces or pages that include content associated with personal webservice applications and/or personal webservice agents related to an item being acquired by an individual.

FIG. 2 illustrates a framework 200 to provide item acquisition user interfaces or pages that include content associated with personal webservice applications and/or personal webservice agents related to an item being acquired by an individual. The framework 200 includes one or more computing devices, represented by computing device 202, that may be operated by an individual 204. In particular, the individual 204 may operate the computing device 202 to purchase an item via an item acquisition pipeline 206.

The item acquisition pipeline 206 may include a number of item acquisition pages that may be provided to the computing device 202 in order for the individual 204 to acquire the item. In the illustrative implementation of FIG. 2, the item acquisition pipeline 206 includes an item detail page 208 that includes information about an item that the individual 204 may purchase. For example, the individual 204 may navigate to a site of a merchant or service provider that is offering a particular item for acquisition. At the site, the individual 204 may select an option to view information about the particular item and, in response, the item detail page 208 may be provided to the computing device 202. In particular, the item detail page 208 may include image content of the particular item, video content of the particular item, audio content of the particular item, text content of the particular item, or combinations thereof. In some cases, the item detail page 208 may include one or more prices of the particular item, ratings of the particular item, reviews of the particular item, an image of the particular item, a text description of the particular item, and the like. Additionally, the item detail page 208 may include an acquisition option 210 (e.g. "Add to Cart," "Buy Now," etc.) that is selectable to initiate a transaction to acquire the particular item.

The item detail page 208 may also include webservice information 212 that is related to a particular item of the item detail page 208. For example, the webservice information 212 may include information provided by one or more webservice applications and/or information provided by one or more webservice agents. In some instances, the individual 204 may invoke a webservice application to provide the webservice information. To illustrate, the item detail page 208 may include one or more options that are selectable to invoke respective webservice applications. In these cases, a service provider may utilize item data 214, profile data 216, webservice data 218, or combinations thereof, to identify webservice applications related to the item of the item detail page 208 and associated with the individual 204 to determine the options to include on the item detail page 208. The item data 214 may include a type of an item to be acquired (e.g. food, appliance, baby products, etc.), the profile data 216 may include information provided by the individual 204 about himself or herself (e.g. demographic information, educational background, health information, interests, etc.), and the webservice data 218 may indicate webservice applications and/or webservice agents that are associated with the individual 204. Any webservice application options included in the item detail page 208 may be selectable to invoke a respective webservice application or agent and provide the webservice information 212. In other instances, one or more webservice applications or webservice agents may be invoked during the rendering of the item detail page 208.

In an illustrative implementation, the individual 204 may be associated with a nutritional content webservice application or webservice agent. When the individual 204 is acquiring food items, the nutritional content webservice application or webservice agent may analyze the nutritional content of the items being acquired and provide an analysis of the nutritional content of the items, provide notifications regarding the nutritional content of the items (e.g. notification that sodium content of an item exceeds a particular amount or exceeds dietary restrictions of the individual 204), provide recommendations for substitute items with different (e.g. healthier) nutritional content, and so forth. The information provided by the nutritional content webservice application or webservice agent may be rendered as the webservice information 212 of the item detail page 208.

The item acquisition pipeline 206 also includes a transaction detail page 220 that may be provided in response to selection of the acquisition option 210. The transaction detail page 220 may include information about the transaction that has been initiated to acquire a particular item. For example, the transaction detail page 220 may include a price of the particular item, delivery options for the particular item, payment instrument information to be utilized to acquire the particular item, and so forth.

The transaction detail page 220 may also include one or more webservice options 222. The webservice options 222 may be selectable to cause operations to be performed related to a personal webservice of the individual 204, cause operations to be performed by webservice applications associated with the individual 204, cause operations to be performed by webservice agents associated with the individual 204, or combinations thereof. For example, the webservice options 222 may include a particular option that is selectable to autoregister a particular item with the manufacturer of the particular item for warranty and recall purposes. In another example, the webservice options 222 may include additional options that are selectable to receive software updates related to the particular item, to receive reviews related to the particular item, and so forth.

In some cases, the item data 214, the profile data 216, the webservice data 218, or combinations thereof, may be utilized to identify particular webservice options 222 to include in the transaction detail page 220. In particular, certain webservice options 222 may be included in the transaction detail page 220 depending on a type of item acquired and/or characteristics of the item acquired. To illustrate, an automatic registration option may be provided when electronic devices, appliances, and so forth are to be acquired, but not when food items are acquired. Additionally, the webservice data 218, such as webservice applications and/or webservice agents associated with the individual 204, may cause certain webservice options 222 to be provided in the transaction detail page 220. For instance, when the individual 204 is associated with a warranty and recall webservice agent, the webservice options 222 may include an auto-register option for certain items and when the individual 204 is associated with a software updates webservice agent, the webservice options 222 may include a receive software updates option.

The transaction detail page 220 may also include webservice recommendations 224 that include recommendations of webservice applications and/or webservice agents applicable to a particular item being acquired by the individual 204. For example, when the individual 204 is acquiring a food item, the webservice recommendations 224 may include a nutritional content webservice agent and/or a best price webservice application that identifies cheaper options for acquiring the particular item or substitute items available for a lower price. In some cases, the webservice recommendations 224 may also be based on the profile data 216 of the individual 204.

Further, the item acquisition pipeline 206 may include a transaction confirmation page 226 that confirms acquisition of a particular item by the individual 204. The transaction confirmation page 226 may include a confirmation number associated with the transaction to acquire the particular item, price of the particular item, delivery option verification, and the like. The transaction confirmation page 226 may also include any webservice options 222 selected by the individual 204, any webservice applications selected by the individual 204, any webservice agents selected by the individual 204, or combinations thereof. In some cases, the transaction confirmation page 226 may be provided to the individual 204 via a site of the merchant offering the particular item for acquisition, via an email, via a text message, via a site of a service provider, or a combination thereof.

Although the item acquisition pipeline 206 of FIG. 2 includes the item detail page 208, the transaction detail page 220, and the transaction confirmation page 226, the item acquisition pipeline 206 may include more pages or fewer pages that include the content of the pages 208, 220, 226. Additionally, the item acquisition pipeline 206 may include content in addition to the content included in the pages 208, 220, 226.

At 228, the framework 200 includes adding an item acquired by the individual 204 via the item acquisition pipeline 206 to a personal webservice of the individual 204. In some cases, the item may be added to the personal webservice of the individual 204 by forwarding a transaction confirmation email to a webservice API, such as the webservice API 102 of FIG. 1. In addition, the webservice API or another service provider component, may add the item and information related to the acquisition of the item to the personal webservice of the individual 204. For example, the webservice API may acquire information about the acquisition of the item from an application residing on the computing device 202, from the merchant that provided the item to the individual 204, from a financial entity that conducted the transaction to obtain the item, and the like. After acquiring the item acquisition data from one or more sources, the webservice API may then add the item and any related information to the personal webservice of the individual 204.

At 230, one or more tags may be applied to the item added to the personal webservice of the individual 204. In some cases, a tag may be applied to the item indicating that the item is included in the personal webservice of the individual 204. In this way, webservice applications associated with the individual 204 can identify items of the personal webservice of the individual 204. Additionally, one or more tags may be applied to the item that indicate particular webservice applications or particular webservice agents that may provide information related to the item. In certain scenarios, each webservice application/agent may be associated with its own tag, and this tag may be applied to items utilized by the webservice application/agent. For example, an electronic device or appliance may be tagged with a warranty and recalls webservice agent tag when the individual 204 is associated with the warranty and recalls webservice agent. In other situations, the item may be provided with a more generic tag, such as "appliance" or "electronic device," that may be utilized by a webservice application/agent to identify items for which supplemental information and/or notifications about the item may be provided.

Example System

Figure 3:
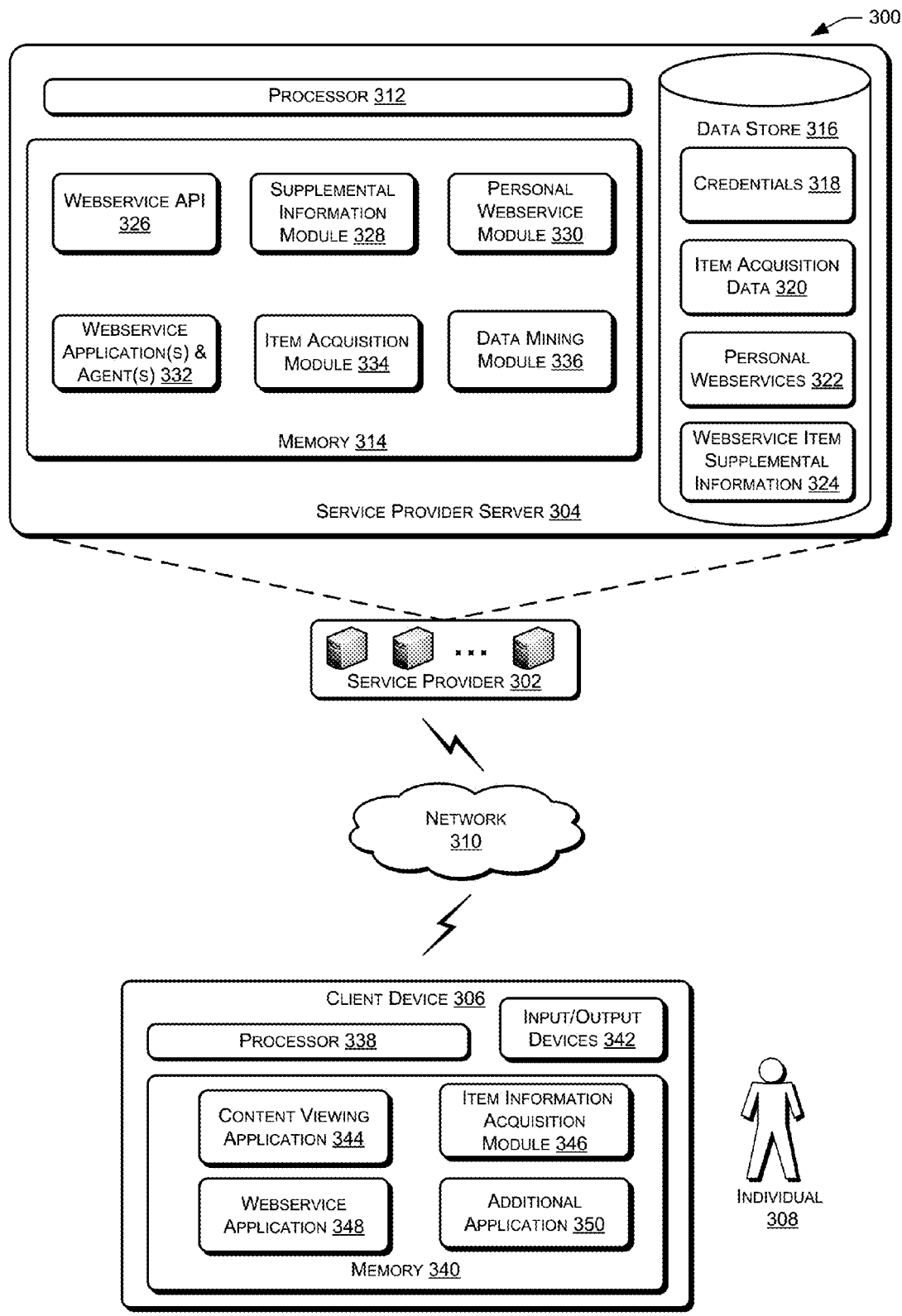
FIG. 3 illustrates a system including a service provider to provide personal webservices for items acquired by individuals.

FIG. 3 illustrates a system 300 including a service provider 302 to provide personal webservices for items acquired by individuals. In particular, the system 300 includes a service provider server 304 that may comprise a single server, a cluster of servers, a server farm or data center, and so forth, although other server architectures (e.g., a mainframe architecture) may also be used. The system 300 also includes a client device 306 operated by an individual 308. The client device 306 may include may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like. Additionally, the service provider server 304 and the client device 306 may communicate via a network 310. The network 310 includes any one or combination of multiple different types of wired and wireless networks, such as the Internet, cable networks, satellite networks, wide area wireless communication networks, wired local area networks, wireless local area networks, and public switched telephone networks (PSTN).

The service provider server 304 includes one or more processors represented by processor 312. The service provider server 304 also includes memory 314 that is accessible by the processor 312. The memory 314 is an example of computer readable storage media and may include volatile memory, nonvolatile memory, removable memory, non-removable memory, or a combination thereof. For example, the memory 314 may include, but is not limited to, RAM, ROM, EEPROM, flash memory, one or more hard disks, solid state drives, optical memory (e.g. CD, DVD), or other non-transient memory technologies. The memory 314 may store a number of modules including computer-readable instructions executable by the processor 312 to provide personal webservices that include information about items acquired by individuals.

The service provider server 304 also includes a data store 316 that may include, but is not limited to, RAM, ROM, EEPROM, flash memory, one or more hard disks, solid state drives, optical memory (e.g. CD, DVD), or other non-transient memory technologies. The data store 316 stores credentials 318 that may be utilized to access information related to item acquisitions from computing devices of individuals, third-party data sources, or both. The credentials 318 may include user names, passwords, tokens, security keys, and the like.

In addition, the data store 316 stores item acquisition data 320 that includes information about items acquired by individuals. In particular, the item acquisition data 320 may include data indicating a scanned UPC, XML files, emails, spreadsheets, presentations, charts, graphs, and other documents that indicate items acquired by individuals. Further, the item acquisition data 320 may include images of items acquired by individuals, such as images of at least portions of items acquired by image capture devices of individuals and/or pictures or scanned images of receipts, financial records, and the like, of the individuals. The item acquisition data 320 may also include financial institution statements, such as credit card, bank, or credit union statements, transaction information obtained from merchants, and so forth. In some cases, the item acquisition data 320 may also include data produced by the service provider 302 with respect to transactions to acquire items via the service provider 302 when the service provider 302 is an online merchant and/or when the service provider 302 provides item acquisition transaction services for merchants.

The data store 316 also stores personal webservices 322 that include information about items acquired by certain individuals. In particular, the personal webservices 322 may indicate items acquired by individuals by storing identifiers associated with the items, such as name, model number, UPC, or other identifiers. The personal webservices 322 may also store additional information associated with the items, such as manufacturers of the items, prices of the items, date of acquisition of the items, and the like. Items stored in the personal webservices 322 may also be stored in association with one or more tags, such as one or more tags indicating respective webservice applications/agents that may utilize information about the items, one or more tags indicating respective types of the items (e.g. appliance, electronic device, food item, etc.), and so on. The personal webservices 322 may also store information specifying items that individuals have indicated an interest in acquiring, such as items on wish lists, items included in registries, items included in media distribution services queues, and so forth.

In addition, the data store 316 stores webservice item supplemental information 324. The webservice item supplemental information 324 may include information about items included in the personal webservices 322, such as news articles, blog posts, reviews, micro-blogging posts, owner's manuals, information from manufacturers (e.g. warranty information, recall notices, warranty extension information, etc.), discussion board posts, information from merchants (e.g. special offers, replacement part information, related items offered for acquisition, etc.), and the like. Further, the webservice item supplemental information 324 may include data obtained from items acquired by individuals, such as data from appliances, vehicles, electronic devices, and so forth. The webservice item supplemental information 324 may also include information related to the consumption of items by individuals. For example, the webservice item supplemental information 324 may include information indicating movies watched by individuals, amounts of food items consumed by the individuals, electronic books read by the individuals, and so on.

The memory 314 stores a webservice API 326 that is executable by the processor 312 to obtain information about items acquired by individuals and/or information about items that individuals have indicated an interest in acquiring. The webservice API 326 may store this information as the item acquisition data 320. In some cases, the webservice API 326 may obtain information from computing devices of individuals. In a particular example, the webservice API 326 may receive information from the computing device 306 relating to the acquisition of items by the individual 308. To illustrate, the webservice API 326 may receive emails and/or other documents forwarded via the computing device 306 indicating items acquired by the individual 308. The webservice API 326 may also receive scanned images of receipts from the computing device 308, images captured via the computing device 306 of at least portions of items acquired by the individual 308, and so on. Additionally, the webservice API 326 may also obtain information from applications residing on the computing device 306, such as financial services applications, email applications, spreadsheet applications, and the like. In certain situations, the webservice API 326 may present the proper credential 318 to a particular application residing on the computing device 306 to obtain information about items acquired by the individual 308. The webservice API 326 may also provide one or more pages to the computing device 306 that include fields that can capture information from the individual 308 relating to the acquisition of items by the individual 308. In some situations, the service provider 302 may provide a site that includes pages that the individual 308 can access to enter information about items acquired by the individual 308.

The webservice API 326 may also obtain information from third-party data sources that indicates items acquired by individuals. To illustrate, the webservice API 326 may obtain information from financial institutions associated with individuals that indicates items acquired by the individuals. The webservice API 326 may also obtain information from merchants regarding items acquired by individuals. Further, the webservice API 326 may obtain information from social networking services, such as social networking sites, micro-blogging sites, location-based social networking sites, and the like. For example, the webservice API 326 may obtain posts on social networking sites by individuals indicating items that have been acquired by the individuals. In some cases, the information obtained from the third-party data sources may be received upon request from the webservice API 326 in association with providing a valid credential 318. In other cases, third-party data sources may have an arrangement with the service provider 302 to provide information about items acquired by individuals upon receiving permission from the respective individuals.

The memory 314 also stores a supplemental information module 328 that is executable by the processor 312 to obtain supplemental information relating to items acquired by individuals and included in the respective personal webservices 322 of the individuals. The supplemental information module 328 may obtain portions of the webservice item supplemental information 324 from various sites, such as news article sites, merchant sites, magazine sites, personal sites of individuals, manufacturer sites, media distribution sites, sites with discussion boards, and so on. In some implementations, the supplemental information module 328 may monitor sites for information about items included in the personal webservices 322 and extract any relevant information from the sites. The supplemental information module 328 may also launch one or more webcrawlers to extract information from sites that is relevant to items of the personal webservices 322. Further, the supplemental information module 328 may communicate with items acquired by individuals, such as vehicles, electronic items (media players, televisions, etc.), appliances, and the like, to obtain the webservice item supplemental information 324.

The supplemental information module 328 may also receive supplemental information about personal webservice items from manufacturers of respective items, merchants offering respective items for acquisition, and the like. In particular, the service provider 302 may have an arrangement with manufacturers and/or merchants to provide supplemental information, such as warranty expiration information and/or recall information. Information obtained via the supplemental information module 328 may be stored as webservice item supplemental information 324. In certain instances, the supplemental information module 328 may identify some of the webservice item supplemental information 324, such as via a tag, as being associated with certain webservice applications or certain webservice agents. For example, the supplemental information module 328 may tag information about recall notices as being associated with a warranty and recalls webservice agent.

Further, the memory 314 stores a personal webservice module 330 that is executable by the processor 312 to filter the item acquisition data 320 in order to produce the personal webservices 322. In particular, the personal webservice module 330 may parse the item acquisition data 320 of individuals and utilize respective portions of the item acquisition data 320 to populate the personal webservices 322. For example, the personal webservice module 330 may utilize image recognition techniques with respect to images of items provided by individuals in order to identify the particular items acquired by the individuals. The personal webservice module 330 may then indicate that the particular items have been acquired by the individuals in the respective personal webservices 322. In another example, the personal webservice module 330 may parse emails, financial statements, documents, and the like, received from individuals and/or third-party data sources in order to identify items acquired by the individuals and indicate the acquisition of the items in the respective personal webservices 322. The personal webservice module 330 may also utilize other information of the emails, financial statements, documents, etc. to populate the respective personal webservices 322, such as prices of the items, dates of purchase of the items, merchants that the items were acquired from, and so forth.

In some situations, the personal webservice module 330 may store a portion of the items acquired by a particular individual in the corresponding personal webservice 322. To illustrate, the personal webservice module 330 may store items acquired by the individual 308 in the respective personal webservice 322 that are relevant to webservice applications/agents associated with the individual 308. For example, the personal webservice module 330 may not store school supply items acquired by the individual 308 when the individual 308 is only associated with a software updates webservice agent. Additionally, the personal webservice module 330 may temporarily store items in the respective personal webservices 322. In some implementations, items, such as food items, may be stored for a certain duration in the personal webservices 322 before being removed. Further, the personal webservice module 330 may remove certain items from the personal webservices 322 upon receiving requests and/or other information (e.g. a receipt from a merchant showing the return of an item) from the individuals indicating that the individuals are no longer in possession of the items. In particular, implementations, the personal webservice module 330 may perform other library and management functions with respect to the personal webservices 322, such as archiving data removed from the personal webservices 322, organizing items of the personal webservices 322 in folders, adding items to the personal webservices 322, and the like.

The personal webservice module 330 may also apply one or more identifiers, such as tags, to items stored in the personal webservices 322. In some implementations, the personal webservice module 330 may apply one or more tags to items of the personal webservices 322 indicating respective webservice applications or agents that may provide information and/or notifications regarding the items. The personal webservice module 330 may also apply generalized tags that can be utilized by webservice applications/agents to identify items of the personal webservices 322 that may be pertinent to respective webservice applications/agents. For example, an item with an appliance tag may be pertinent to a warranty and recalls webservice agent. The personal webservice module 330 may also format the information included in the personal webservices 322 according to a particular format, such that the information is consumable by one or more webservice applications/agents that utilize the information of the personal webservices 322.

In addition, the personal webservice module 330 may provide individuals access to the information of the personal webservices 322. In some cases, the personal webservice module 330 may generate one or more pages showing items acquired by an individual and/or items that the individual has indicated an interest in acquiring. The one or more pages may also include other information about the items (e.g. prices, purchase dates, manufacturers, etc.). In certain situations, the pages may be accessible via a site provided by the service provider 302 and/or via a mobile device application residing on a computing device of the individual.

In some instances, the personal webservice module 330 may operate in conjunction with the webservice API 326 to generate the personal webservices 322 and provide the contents of respective personal webservices 322 to individuals. Additionally, at least portions of the operations described with respect to the personal webservice module 330 may be performed by the webservice API 326 and at least portions of the operations described with respect to the webservice API 326 may be performed by the personal webservice module 330.

The memory 314 stores one or more webservice applications and agents 332. The one or more webservice applications and agents 332 may be executable to provide certain webservice item supplemental information 324 to individuals depending on the particular purpose of a respective webservice application 332 or the particular purpose of a respective webservice agent 332. For example, a recent activity webservice application 332 may parse the webservice item supplemental information 324 and provide any news articles, blog posts, price changes, etc. to an individual about a collectible baseball card that an individual has acquired. The one or more webservice applications and agents 332 may also be executable to provide notifications about items included in the personal webservices 322. To illustrate, a software update webservice agent 324 may generate notifications to respective individuals that software updates associated with items of their respective personal webservices 322 are available. Individuals may also specify preferences with respect to the webservice applications and agents 332, such that the webservice applications and agents 332 operate with respect to particular items of the personal webservices 322, operate with respect to particular portions of the webservice item supplemental information 324, or both.

In some scenarios, respective instances of the webservice applications 332 may be provided to client devices of individuals, such that the webservice applications reside on the client devices. In other instances, applications of the client devices, such as browsing applications or other content viewing applications, interact with the webservice applications and agents 332 of the service provider server 304 to provide respective supplemental information and/or notifications to individuals relating to items of their particular personal webservice 322. In particular implementations, one or more of the webservice applications and agents 332 may be accessible to individuals as part of a subscription agreement. Additionally, the webservice applications and agents 332 may be accessible to individuals upon purchase. Some webservice applications and agents 332 may be accessible to individuals without any charge.

Although in many situations, acquisition of the webservice applications and agents 332 is voluntary, in certain situations, individuals may be required to acquire particular webservice applications and agents 332. To illustrate, when safety issues or health issues are associated with an item, such as acquisition of a particular medical device, and/or government regulations are associated with an item, some webservice applications and agents 332 may be automatically provided to or otherwise associated with an individual acquiring the item. In some cases, the terms of service associated with acquiring a particular item via a merchant or service provider may specify that certain webservice applications and agents 332 are to be associated with individuals acquiring the particular item via the merchant or the service provider.

In an illustrative implementation, the individual 308 may be associated with a warranty and recalls webservice agent 332. The warranty and recalls webservice agent 332 may obtain information from the personal webservice 322 of the individual 308 to identify items acquired by the individual 308 and/or items that the individual 308 has indicated an interest in acquiring. The warranty and recalls webservice agent 332 may also filter the items of the personal webservice 322 of the individual 308 to identify items identified for use by the warranty and recalls webservice agent 332. Upon identifying items that are associated with the warranty and recalls webservice agent 332, the webservice agent 332 may parse the webservice item supplemental information 324 and/or work in conjunction with the supplemental information module 328 to identify any supplemental information that is relevant to particular items included in the personal webservice 322 of the individual 308. The warranty and recalls webservice agent 332 may also access or otherwise communicate with other sources storing supplemental information, such as a manufacturer of an item, to obtain supplemental information associated with the particular items included in the personal webservice 322.

In some cases, the warranty and recalls webservice agent 332 may forward relevant portions of the webservice item supplemental information 324, such as a news article indicating that an item of the personal webservice 322 of the individual 308 is the subject of a recall notice. The warranty and recalls webservice agent 332 may alternatively, or additionally, generate a notification indicating that the particular item is the subject of a recall notice. The warranty and recalls webservice agent 332 may also be executable to provide updates associated with new webservice item supplemental information 324 that may be relevant to items included in the personal webservice 322 of the individual 308 and filter supplemental information that has already been provided to the individual 308 and/or supplemental information that is redundant.

Additionally, the memory 314 stores an item acquisition module 334 that is executable by the processor 312 to provide an item acquisition pipeline, such as the item acquisition pipeline 206 of FIG. 2, for individuals to acquire items. In some cases, the item acquisition module 334 may provide the item acquisition pipeline with respect to the acquisition of items from the service provider 302. In other cases, the item acquisition module 334 may provide the item acquisition pipeline with respect to the acquisition of items from merchants that obtain item acquisition services from the service provider 302. The item acquisition module 334 may also conduct transactions with financial institutions such that individuals can acquire items via the service provider 302.

In a particular implementation, the item acquisition module 334 may be executable by the processor 312 to provide one or more pages of the item acquisition pipeline, such as item detail pages, transaction detail pages, transaction confirmation pages, and the like. The item acquisition module 334 may also identify one or more webservice options to include on pages of the item acquisition pipeline, such as transaction detail pages. The webservice options may be selectable to apply one or more of the webservice applications and agents 332 to an item being acquired by an individual. For example, the webservice options may relate to obtaining software updates to electronic devices or software purchased by individuals, automatic registration of items with manufacturers for warranty and recall purposes, and so forth. In some cases, the webservice options may relate to particular webservice applications and agents 332 associated with an individual. To illustrate, the item acquisition module 334 may provide webservice options related to automatic registration of an item when the individual acquiring the item is associated with a warranty and recalls webservice application or agent. Further, the webservice options provided by the item acquisition module 334 may depend on characteristics of the item being acquired. In an illustrative implementation, the item acquisition module 334 would refrain from providing an automatic registration webservice option on a transaction detail page when an individual is acquiring food items.

The item acquisition module 334 may also obtain webservice information from one or more webservice applications and/or one or more webservice agents associated with an individual acquiring an item. In one example, the item acquisition module 334 may operate in conjunction with a nutritional content webservice agent to provide nutritional content information and/or messages about nutritional content on an item acquisition page provided during acquisition of particular food items. The item acquisition module 334 may also provide webservice recommendations for webservice applications and/or webservice agents that an individual acquiring an item may be interested in. To illustrate, the item acquisition module 334 may determine that a particular item being acquired, such as a media player, is associated with certain webservice applications and/or webservice agents, such as a warranty and recalls webservice agent. Thus, the item acquisition module 334 may render a page provided during acquisition of the item indicating the recommended webservice applicants and agents.

The memory 314 also includes a data mining module 336 that is executable by the processor 312 to analyze information associated with the personal webservices 322. In some cases, the data mining module 336 may identify items that are most often acquired by individuals based on items included in the personal webservices 322. The data mining module 336 may also identify prices of items, frequency of recall of items by certain manufacturers, seasonal acquisition of items by individuals, demographic information associated with individuals acquiring particular items, item acquisition trends, and the like. In certain situations, the information analyzed by the data mining module 336 may be utilized by the service provider 302 and/or certain merchants to generate special offers with respect to particular items, identify items to include in inventory, identify pricing with respect to certain items, provide recommendations for items to acquire, and so forth.

The client device 306 includes a processor 338 and memory 340. The memory 340 is an example of computer readable storage media and may include volatile memory, nonvolatile memory, removable memory, non-removable memory, or a combination thereof. For example, the memory 340 may include, but is not limited to, RAM, ROM, EEPROM, flash memory, one or more hard disks, solid state drives, optical memory (e.g. CD, DVD), or other non-transient memory technologies. In addition, the memory 340 may store a number of applications including computer-readable instructions executable by the processor 338 to provide a respective personal webservice 322 for the individual 308.

The client device 306 may also include one or more input/output devices 342. The input/output devices 342 may include a display, a touchpad, a touch screen, a pointer device, speakers, microphones, keyboard, image capture devices (e.g. camera, scanner), and the like. In some cases, the client device 306 may also be coupled to one or more peripheral devices (not shown), such as a scanner, printer, barcode reader, etc. via one or more peripheral device interfaces of the client device 306.

The memory 340 includes one or more content viewing applications represented by content viewing application 344 that is executable by the processor 338 to view electronic content provided by a number of sources. In some cases, the content viewing application 344 may be a browser application that may be executable to view pages of sites provided by electronic content sources. In other cases, the content viewing application 344 may include a mobile device application. The content viewing application 344 may be executable by the processor 338 to access electronic content to acquire items from merchants and/or the service provider 302. The content viewing application 344 may also be executable by the processor 338 to view items and information of a personal webservice 322 of the individual 308.

The memory 340 may also include one or more item information acquisition modules represented by item information acquisition module 346. The item information acquisition module 346 may be executable by the processor 338 to obtain information about an item acquired by the individual 308. For example, the item information acquisition module 346 may be a scanning application that is executable to scan images of receipts including items acquired by the individual 308. The item information acquisition module 346 may also be an image capture device application that is executable to capture images of items acquired by the individual 308. In some cases, the item information acquisition module 346 can provide item information to the service provider 302. To illustrate, after capturing an image of an item acquired by the individual 308, the item information acquisition module 346 may send a message to the service provider 302 with an image of the item as an attachment. The message may indicate that the image is to be stored in association with the respective personal webservice 322 of the individual 308.

Additionally, the memory 340 may include one or more webservice applications represented by webservice application 348. The webservice application 348 may be obtained from the service provider 302, from one or more third-party webservice application developers, or both. The webservice application 348 may be executable by the processor 338 to obtain supplemental information associated with particular items included in the respective personal webservice 322 of the individual 308 and provide portions of the supplemental information and/or provide notifications derived from the supplemental information to the individual 308. In some cases, the webservice application 348 may operate in a manner similar to the webservice applications 332 of the service provider server 304. The webservice application 348 may operate in conjunction with modules of the service provider server 304, such as the supplemental information module 328, the personal webservice module 330, or both, to provide supplemental information and/or related notifications to the individual 308.

The memory 340 also includes an additional application 350. The additional application 350 may be an email application, a spreadsheet application, a financial services application, an operating system, and the like. The additional application 350 may provide particular item acquisition data to the service provider server 304. In certain situations, the additional application 350 may provide the particular item acquisition data to the service provider server 304 upon receiving a request from the service provider server 304. In some cases, the additional application 350 may be an email application that provides emails to the service provider server 304 that include content related to the acquisition of items by the individual 308. In other cases, the additional application 350 may be a spreadsheet application or financial services application that provides to the service provider server 304 documents or other information that is associated with items acquired by the individual 308.

Example User Interfaces

Figure 4:
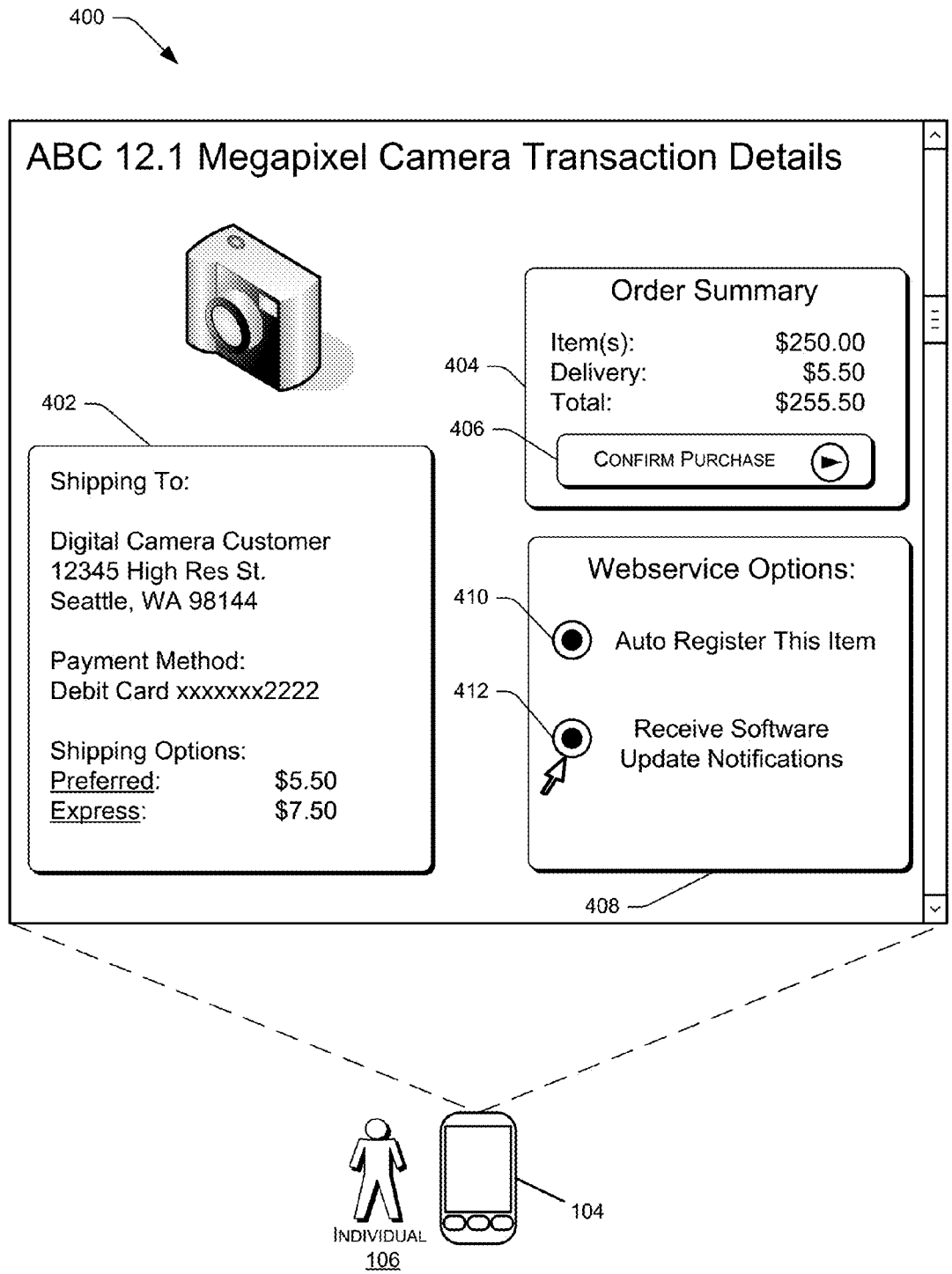
FIG. 4 shows a user interface including information relating to a transaction to acquire an item and one or more options selectable to cause a respective webservice application or agent to perform specified operations associated with the item.

FIG. 4 shows a user interface 400 including information relating to a transaction to acquire an item and one or more options selectable to cause a respective webservice application or agent to perform specified operations with respect to the item. The user interface 400 may be provided via a display of a computing device, such as the computing device 104 operated by the individual 106. The user interface 400 includes information about an item, the ABC 12.1 Megapixel Camera, that is being acquired by the individual 106. The user interface 400 may comprise a transaction detail page.

The user interface 400 includes portions 402 and 404 that include information about the acquisition of the ABC 12.1 Megapixel Camera. For example, the portion 402 includes payment instrument information and shipping options associated with the acquisition of the ABC 12.1 Megapixel Camera. Additionally, the portion 404 includes information related to the price of the item and an option 406 that is selectable to finalize the transaction to acquire the item. In some cases, selection of the option 406 may cause a transaction confirmation page to be provided to the computing device 104.

The user interface 400 also includes a portion 408 that includes a number of webservice options 410, 412. The webservice options 410, 412 may be included in the portion 408 based on information about and/or characteristics of the ABC 12.1 Megapixel Camera, webservice applications/agents associated with the individual 106, or both. In the particular implementation shown in FIG. 4, the portion 408 includes the webservice option 410 to auto-register the ABC 12.1 Megapixel Camera with the manufacturer. The portion 408 also includes the webservice option 412 to receive notifications of software updates to the ABC 12.1 Megapixel Camera.

Figure 5:
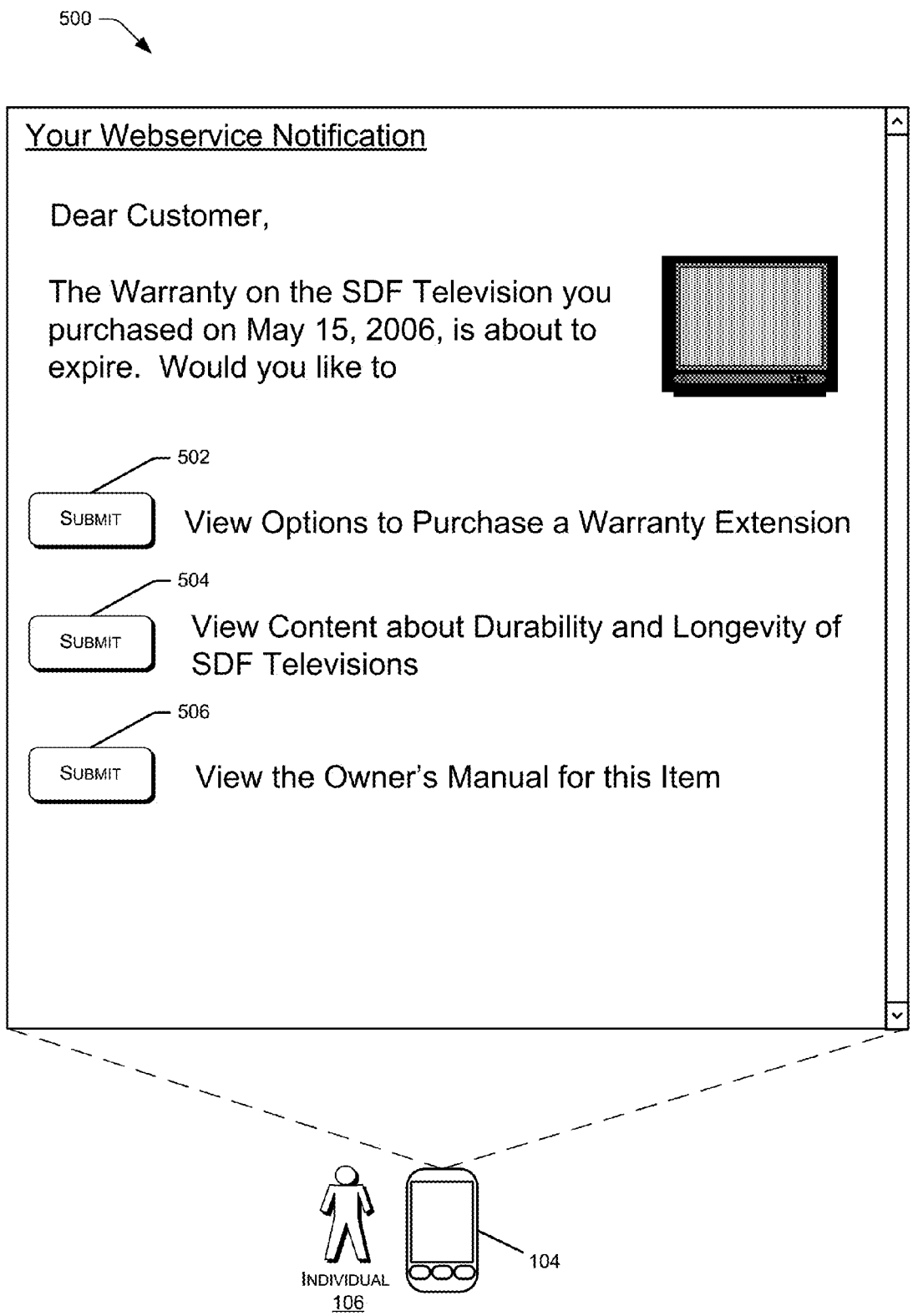
FIG. 5 shows a user interface including a notification provided by a webservice application or webservice agent corresponding to an item acquired by an individual.

FIG. 5 shows a user interface 500 including a notification provided by a webservice application or webservice agent corresponding to an item acquired by an individual. The user interface 500 may be provided via a display of a computing device, such as the computing device 104 operated by the individual 106. In some cases, the user interface 500 includes a notification generated by a webservice application or webservice agent, such as a warranty and recalls webservice agent. The webservice agent may have provided the notification to the computing device 104 in response to determining that a warranty for the SDF Television acquired by the individual 106 will soon expire.

The user interface 500 includes a number of options 502-506 that may be provided with the warranty expiration notification. In particular, the option 502 is selectable to view options to purchase an extension of the warranty. Additionally, the option 504 is selectable to view content, such as reviews and/or articles, that indicate the durability and longevity of SDF Televisions. In some cases, the individual 106 may utilize information received upon selection of the option 504 to determine whether or not to acquire a warranty extension. Further, the option 506 is selectable to view the owner's manual for the SDF Television acquired by the individual 106. In certain situations, the individual 106 may consult the owner's manual to determine if the warranty is a limited warranty or applies to all portions of the SDF television.

Example Processes

Figure 6:
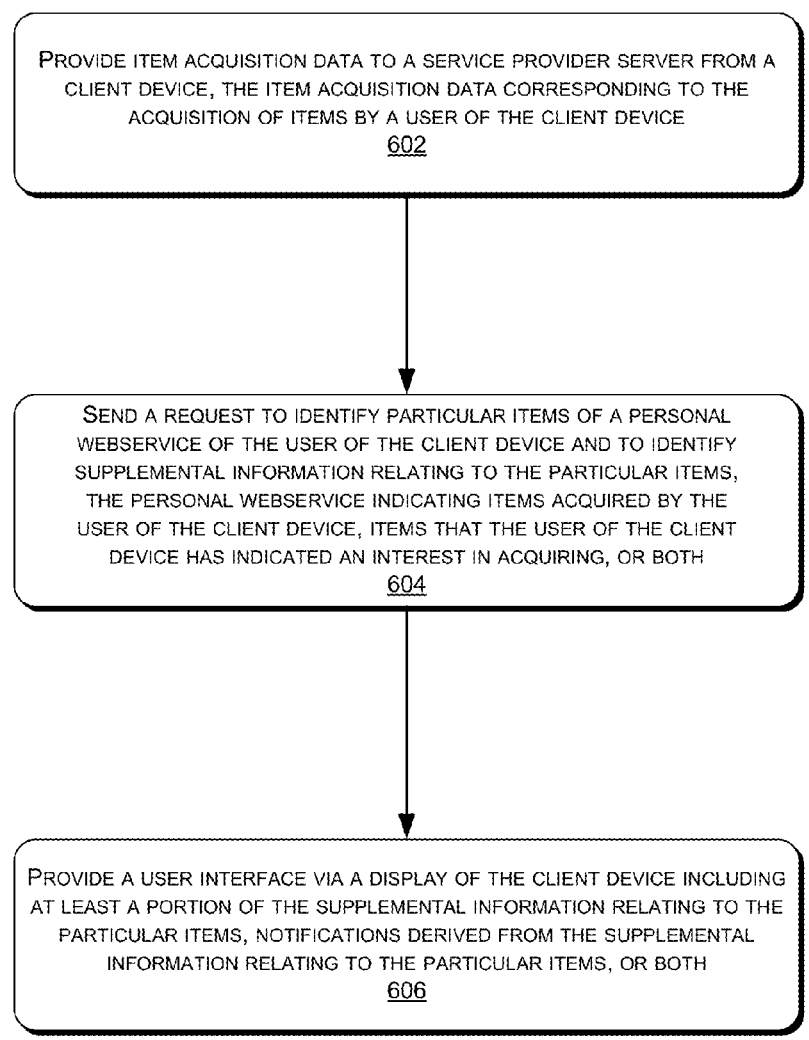
FIG. 6 is a flow diagram of a process to obtain supplemental information and/or notifications derived from the supplemental information that are related to particular items of a personal webservice of an individual.
Figure 7:
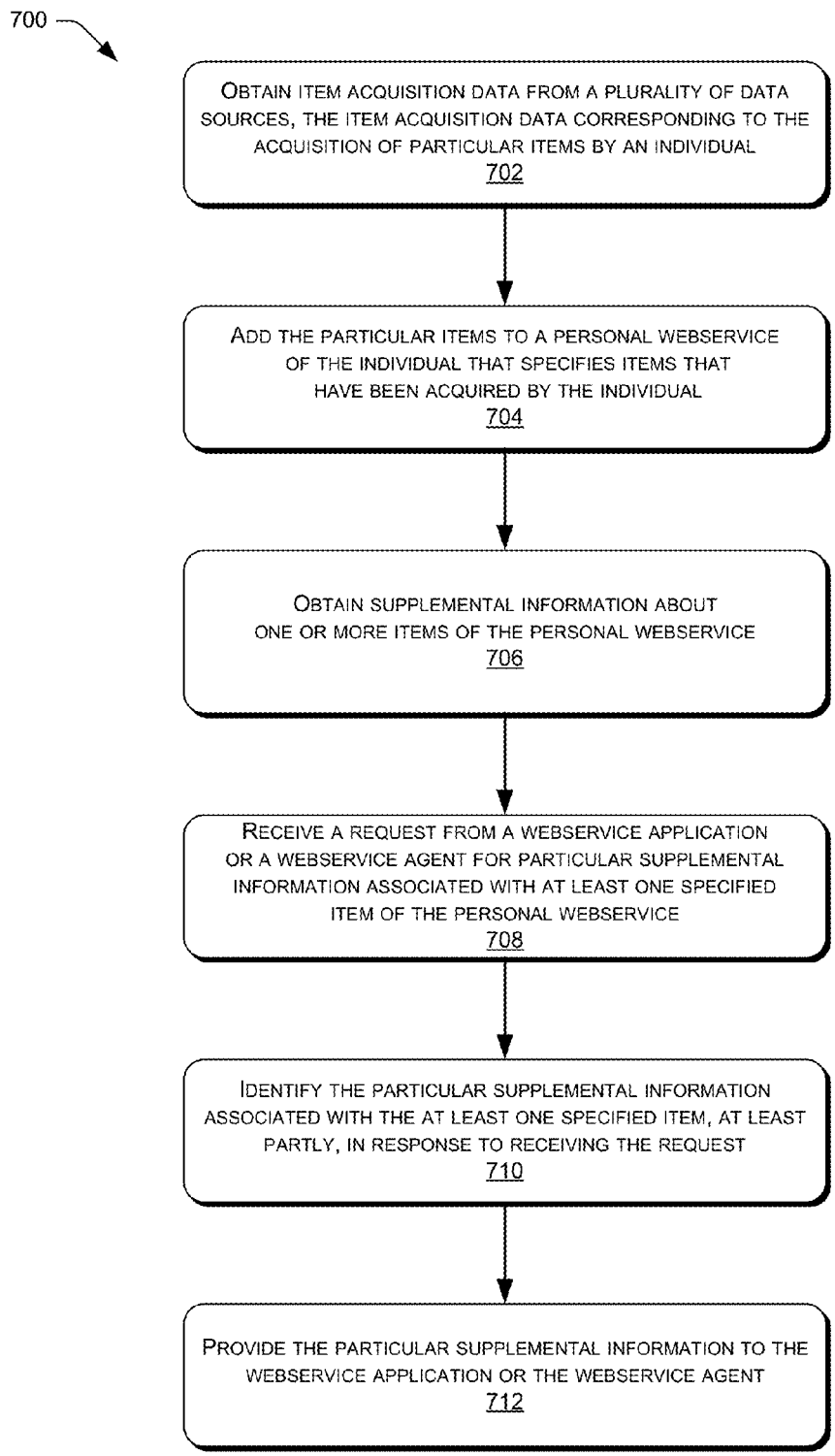
FIG. 7 is a flow diagram of a process to obtain data corresponding to the acquisition of items by an individual and to provide particular supplemental information relating to items acquired by the individual to a personal webservice application or a personal webservice agent.
Figure 8:
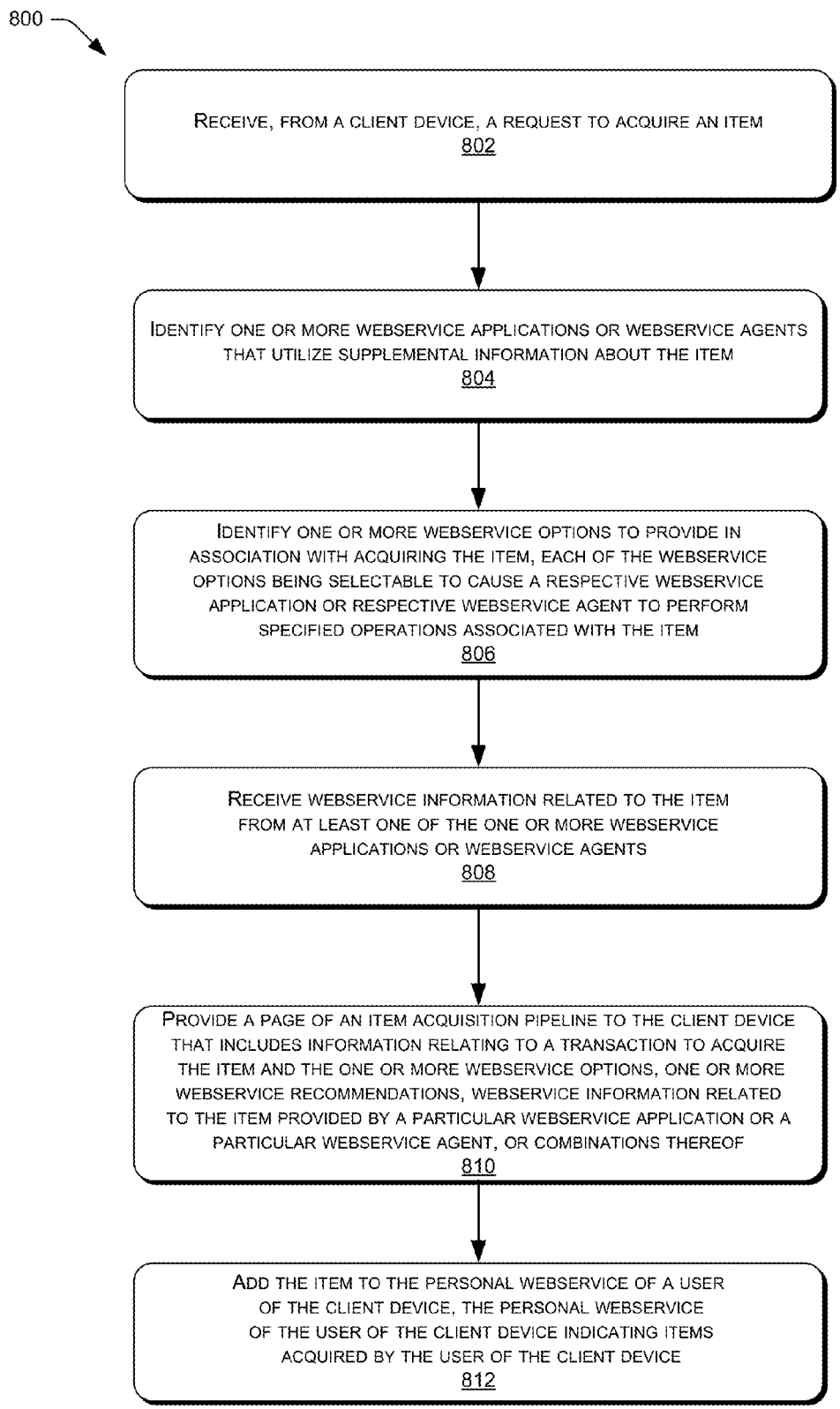
FIG. 8 is a flow diagram of a process to provide a page of an item acquisition pipeline to a client device that includes information relating to a transaction to acquire an item and one or more webservice options, webservice recommendations, webservice information provided by a particular webservice application or agent, or combinations thereof, related to the item.

FIGS. 6-8 show processes 600-800 respectively, to provide personal webservices to individuals. The processes 600-800 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 6-8 may be performed by one or more of the components shown in FIGS. 1-5, such as the computing devices 104, 202, the client device 306, the service provider server 304, other computing devices, or a combination thereof.

FIG. 6 is a flow diagram of a process 600 to obtain supplemental information and/or notifications derived from the supplemental information that are related to particular items of a personal webservice of an individual. In particular, at 602, the process 600 includes providing item acquisition data to a service provider server from a client device. The item acquisition data corresponds to the acquisition of particular items by a user of the client device. The item acquisition data may be provided to the service provider via a particular application executing on the client device, such as an email application, a financial services application, a spreadsheet application, and the like. The item acquisition data may also include an image of at least a portion of an item acquired by a user of the client device, data indicating a scanned identifier (e.g. UPC), and the like. In some cases, the image may be captured by an image capture device of the client device, a scanner coupled to the client device, and so forth.

At 604, a request is sent to identify particular items of a personal webservice of the user of the client device and to identify supplemental information relating to the particular items. The personal webservice may indicate items acquired by the user of the client device, items that the user of the client device has indicated an interest in acquiring, or both. In some situations, the request may be sent to a service provider that provides personal webservices to individuals. Additionally, multiple requests may be sent, such as a request to a service provider to identify items of the personal webservice and a request to manufacturers of items, merchants, and/or other data sources in order to obtain particular supplemental information about the items of the personal webservice.

In some cases, the request may be sent via a webservice application executing on the client device. The personal webservice application may be one of a plurality of webservice applications residing on the client device. In certain cases, each webservice application may be executable to identify different groups of items of a personal webservice and perform specific operations with respect to the items of a respective group. For example, a warranty and recalls webservice application may be operable to identify recall information associated with certain items of the personal webservice, while a software updates webservice application may be operable to identify software updates with respect to at least some items of the personal webservice that may be different from the items associated with the warranty and recalls application. In particular implementations, the request may be sent by another application, such as a browser application, to invoke a personal webservice application located remotely from the client device, such as a personal webservice application residing on a service provider server.

At 606, the process includes providing a user interface to the client device that includes at least a portion of the supplemental information relating to the particular item, notifications derived from the supplemental information relating to the particular item, or both. To illustrate, a warranty and recalls webservice application may provide a notification that the warranty of an item acquired by the user of the client device is about to expire or that an item acquired by the user of the client device is the subject of a recall notice.

FIG. 7 is a flow diagram of a process 700 to obtain data corresponding to the acquisition of items by an individual and to provide particular supplemental information relating to items acquired by the individual to a personal webservice application or a personal webservice agent. At 702, a service provider obtains item acquisition data from a plurality of data sources. The item acquisition data corresponds to the acquisition of particular items by an individual. In some cases, the plurality of data sources may include a computing device of the individual, third-party data sources, items acquired by the individual (e.g. electronic devices, appliances, vehicles, and so on), or combinations thereof. In particular implementations, when the plurality of data sources include the computing device of the individual, the plurality of data sources may include one or more applications residing on the computing device, a storage device associated with the computing device (e.g. an internal hard drive, an external hard drive, a flash memory drive, etc.), and so on. Additionally, the third-party data sources may include financial institutions, social networking services, micro-blogging services, merchants offering items for acquisition, media distribution services, or combinations thereof. In some cases, a credential may be provided to obtain the item acquisition data.

At 704, the process 700 includes adding the particular items to a personal webservice of the individual that specifies items that have been acquired by the individual. The personal webservice may also indicate items that the individual has indicated in interest in acquiring. In particular implementations, each of the one or more items of the personal webservice are associated with at least one identifier, such as a tag. The at least one identifier may indicate that a respective item of the personal webservice is associated with a particular webservice application/agent, that the respective item is associated with the personal webservice of the individual, or both.

At 706, the service provider obtains supplemental information about one or more items of the personal webservice of the individual. In some cases, the service provider may obtain supplemental information about the one or more items of the personal webservice by monitoring sites for the supplemental information about the one or more items. The service provider may also invoke a web crawler to identify the supplemental information about the one or more items. Further, the service provider may send requests to respective manufacturers of the one or more items of the personal webservice for the supplemental information about the one or more items. Additionally, the supplemental information may include at least portions of articles relating to at least one item of the personal webservice, blog posts relating to the at least one item, reviews relating to the at least one item, warranty information relating to the at least one item, recall information relating to the at least one item, software updates relating to the at least one item, online discussions relating to the at least one item, manuals relating to the at least one item, or combinations thereof.

At 708, the service provider receives a request from a webservice application or webservice agent for particular supplemental information associated with at least one specified item of the personal webservice. In some cases, the webservice application may reside on a client device of the individual. In other cases, the webservice application or webservice agent may reside on a service provider server. At 710, the process 700 includes identifying particular supplemental information associated with at least one specified item, at least partly in response, to receiving the request from the webservice application, and, at 712, the service provider provides the particular supplemental information to the webservice application or the webservice agent.

FIG. 8 is a flow diagram of a process 800 to provide a page of an item acquisition pipeline to a client device that includes information relating to a transaction to acquire an item and one or more webservice options, webservice recommendations, webservice information provided by a particular webservice application or agent, or combinations thereof, related to the item. At 802, a service provider receives a request from a client device to acquire an item. The request may be received via a page of an item acquisition pipeline provided by the service provider, such as an item detail page. At 804, the service provider identifies one or more webservice applications or webservice agents that utilize supplemental information about the item. For example, the service provider may parse the supplemental information to identify tags associated with particular portions of the supplemental information indicating that the particular portions are utilized by the one or more webservice applications and/or one or more webservice agents.

At 806, the service provider identifies one or more webservice options to provide in association with acquiring the item. The one or more webservice options may each be selectable to cause a respective webservice application or a respective webservice agent to perform specified operations with respect to the item. In some cases, a respective webservice application or agent may provide at least a portion of the supplemental information associated with the item. The respective webservice application or agent may also provide a notification about the item derived from the supplemental information associated with the item.

At 808, the process 800 includes receiving webservice information related to the item from at least one of the one or more webservice applications or webservice agents associated with the item. For example, a nutritional content webservice agent may provide webservice information about the item, such as nutritional content information, when the item being acquired is a food item. The webservice information may also include messages and/or recommendations to acquire other items. Continuing with the example above relating to the nutritional content webservice agent, the nutritional content webservice agent may provide a message indicating that the item is too high in sugar based on dietary restrictions of the user of the client device and provide recommendations for items with lower sugar content.

At 810, the process 800 includes providing a page of an item acquisition pipeline to the client device that includes information relating to a transaction to acquire the item. The page may also include the one or more webservice options, one or more webservice recommendations (e.g. webservice application/agent recommendations), webservice information related to the item provided by a particular webservice application or a particular webservice agent, or combinations thereof. In certain situations, the page may include the one or more webservice options based, at least in part, on the one or more webservice applications/agents that utilize supplemental information about the item. For example, the page may include an option to auto-register the item with the manufacturer of the item when the user of the client device is associated with a warranty and recalls webservice agent. In another example, the webservice options included in the page may be based on characteristics of the item. To illustrate, the page may include an option selectable to receive software updates when the item is a software application, but not when the item is a food item. At 810, the service provider adds the item to a personal webservice of a user of the client device. The personal webservice of the user of the client device indicates items that the user of the client device has acquired or has indicated an interest in acquiring.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computing systems of a service provider, the one or more computing systems configured with specific executable instructions,
      obtaining item acquisition data from a plurality of data sources, the item acquisition data corresponding to acquisition of a plurality of items by an individual;
      storing a personal webservice of the individual in a data store of the service provider, the personal webservice specifying that the plurality of items have been acquired by the individual;
      obtaining supplemental information about the plurality of items;
      determining that a portion of the supplemental information is associated with a webservice application from among a plurality of webservice applications, the webservice application being related to a group of items;
      applying a tag to the portion of the supplemental information, the tag being associated with the webservice application;
      determining that an item of the personal webservice is included in the group of items related to the webservice application;
      applying the tag to the item of the personal webservice;
      identifying, by the webservice application, the item in the personal webservice based, at least in part, on the tag;
      parsing, by the webservice application, the portion of the supplemental information, based at least in part on the tag, to identify information related to the item; and
      generating one or more pages of a site of the service provider that are accessible to the individual, the one or more pages including the item and the information about the item identified by the webservice application.

2. The computer-implemented method as recited in claim 1, wherein the webservice application operates without being expressly invoked.

3. The computer-implemented method as recited in claim 1, further comprising providing one or more additional pages of the site of the service provider, the one or more additional pages including fields to capture additional information about the plurality of items acquired by the individual.

4. The computer-implemented method as recited in claim 1, wherein individual items of the plurality of items are added to the personal webservice of the individual based, at least in part, on preferences of the individual.

5. The computer-implemented method as recited in claim 1, further comprising:
   generating, by the webservice application, a notification about the item included in the personal webservice based, at least in part, on additional supplemental information obtained by the webservice application related to the item.

6. The computer-implemented method as recited in claim 1, wherein the webservice application resides on a server of the service provider.

7. The computer-implemented method as recited in claim 1, wherein an additional webservice application resides on a computing device of the individual.

8. The computer-implemented method as recited in claim 1, further comprising generating one or more additional pages showing additional items that the individual has indicated an interest in acquiring.

9. The computer-implemented method as recited in claim 1, wherein:
the item is a first item of the personal webservice, the tag is a first tag, and the webservice application is a first webservice application; and
the method further comprises:
applying a second tag to a second item of the personal webservice, wherein the second tag is related to a second webservice application; and
parsing, by the second webservice application, the supplemental information to identify an additional portion of the supplemental information related to the second item, the additional portion of the supplemental information being different from the portion of the supplemental information that is associated with the first webservice application.

10. The computer-implemented method as recited in claim 1, further comprising formatting the item acquisition data, such that the item acquisition data is consumable by the webservice application.

11. The computer-implemented method as recited in claim 1, further comprising determining that the webservice application is associated with the item based at least partly on at least one of data related to the item or data related to the individual.

12. A system comprising:
one or more processors;
memory accessible by the one or more processors, the memory storing computer readable storage media including:
one or more modules including computer-executable instructions that when executed by the one or more processors perform operations comprising:
storing a personal webservice of an individual in a data store of a service provider, the personal webservice specifying items that have been acquired by the individual;
obtaining supplemental information about the items of the personal webservice;
determining that a portion of the supplemental information is associated with a webservice application from among a plurality of webservice applications, the webservice application being related to a group of items;
applying a tag to the portion of the supplemental information, the tag being associated with the webservice application;
determining that an item of the personal webservice is included in the group of items related to the webservice application;
applying the tag to the item of the personal webservice;
identifying, by the webservice application, the item in the personal webservice based, at least in part, on the tag;
parsing, by the webservice application, the portion of the supplemental information, based at least in part on the tag, to identify information related to the item; and
generating one or more pages of a site of the service provider, the one or more pages including the item and the information about the item identified by the webservice application.

13. The system as recited in claim 12, wherein the operations further comprise:
receiving, from a client device of the individual, a request to acquire the item;
identifying a webservice option to provide in association with acquiring the item, the webservice option being selectable to cause the webservice application to perform operations associated with the item; and
providing an item acquisition page to the client device, the item acquisition page including information relating to a transaction to acquire the item and information relating to the webservice option.

14. The system as recited in claim 13, wherein the webservice option is included in the item acquisition page based, at least in part, on the information related to the item identified by the webservice application, characteristics of the item, or combinations thereof.

15. The system as recited in claim 12, wherein the operations further comprise:
applying the tag to an additional item of the personal webservice, the tag indicating that the additional item is associated with the webservice application; and
applying an additional tag to the additional item, the additional tag indicating that the additional item is related to an additional webservice application that is different from the webservice application.

16. The system as recited in claim 13, wherein the operations associated with the item include providing, to the client device, the information related to the item identified by the webservice application, providing, to the client device, a notification about the item derived from the information related to the item identified by the webservice application, or both.

17. The system as recited in claim 13, wherein the operations further comprise providing recommendations for one or more webservice applications related to the item, recommendations for one or more webservice agents related to the item, or both.

18. The system as recited in claim 12, wherein the operations further comprise analyzing information about the items of the personal webservice to identify special offers to make available with respect to one or more items of the personal webservice.

19. The system as recited in claim 12, wherein the webservice application filters the one or more items of the personal webservice according to the tag to determine that the item is associated with the webservice application.

20. The system as recited in claim 12, wherein the operations further comprise:
applying an additional tag to the item of the personal webservice, wherein the additional tag is related to a webservice agent; and
parsing, by the webservice agent, the supplemental information to identify an additional portion of the supplemental information that is related to the item.

21. The system as recited in claim 12, wherein the operations further comprise determining that the webservice application is associated with the item based at least partly on at least one of data related to the item or data related to the individual.

22. A non-transitory computer-readable storage media storing computer-readable instructions that, when executed, instruct a processor to perform operations comprising:
obtaining item acquisition data from a plurality of data sources, the item acquisition data corresponding to acquisition of an item by an individual;

storing a personal webservice of the individual in a data store of a service provider, the personal webservice specifying that one or more items have been acquired by the individual;

obtaining supplemental information about an item of the personal webservice;

determining that a portion of the supplemental information is associated with a webservice application from among a plurality of webservice applications, the webservice application being related to a group of items;

applying a tag to the portion of the supplemental information, the tag being associated with the webservice application;

determining that an item of the personal webservice is included in the group of items related to the webservice application;

applying the tag to the item of the personal webservice;

identifying, by the webservice application, the item in the personal webservice based, at least in part, on the tag;

parsing, by the webservice application, the portion of the supplemental information to identify information related to the item; and generating one or more pages of a site of the service provider, the one or more pages including the item and the information about the item identified by the webservice application.

23. The non-transitory computer-readable storage media as recited in claim 22, wherein the operations further comprise providing recommendations to the individual for items to acquire based, at least in part, on the one or more items included in the personal webservice.

24. The non-transitory computer-readable storage media as recited in claim 22, wherein the item acquisition data includes an image of the item and the item is identified with image recognition techniques.

25. The non-transitory computer-readable storage media as recited in claim 22, wherein information about the item is included in the personal webservice for a period of time.

26. The non-transitory computer-readable storage media as recited in claim 22, wherein the operations further comprise receiving a request to remove the item from the personal webservice.

* * * * *